United States Patent
Busenbender

(10) Patent No.: US 7,659,016 B2
(45) Date of Patent: *Feb. 9, 2010

(54) FUEL CELL WITH A DEVICE FOR STORING WATER

(75) Inventor: Ilona Busenbender, Rheinbreitbach (DE)

(73) Assignee: GM Global Technology Operations, Inc., Detroit, MI (US)

( * ) Notice: Subject to any disclaimer, the term of this patent is extended or adjusted under 35 U.S.C. 154(b) by 1031 days.

This patent is subject to a terminal disclaimer.

(21) Appl. No.: 10/878,336

(22) Filed: Jun. 28, 2004

(65) Prior Publication Data

US 2004/0234838 A1    Nov. 25, 2004

Related U.S. Application Data

(62) Division of application No. 09/996,859, filed on Nov. 20, 2001, now Pat. No. 6,794,076.

(30) Foreign Application Priority Data

Dec. 19, 2000    (DE)    ................. 100 63 254

(51) Int. Cl.
H01M 8/00     (2006.01)
H01M 2/00     (2006.01)
H01M 8/04     (2006.01)
H01M 2/14     (2006.01)

(52) U.S. Cl. ............... 429/12; 429/34; 429/24; 429/38; 429/39

(58) Field of Classification Search ............ 429/12, 429/34, 24, 38, 39
See application file for complete search history.

(56) References Cited

U.S. PATENT DOCUMENTS 5,149,600 A     9/1992    Yamase et al. ............. 429/17
6,536,546 B2 *  3/2003    Roeser et al. ............. 180/65.1

FOREIGN PATENT DOCUMENTS

DE         199 29 556        12/2000

OTHER PUBLICATIONS

The Random House Dictionary,1980, Random House Inc. Revised Edition, Section C.*

* cited by examiner

*Primary Examiner*—Patrick Ryan
*Assistant Examiner*—Helen O Chu
(74) *Attorney, Agent, or Firm*—Reising Ethington P.C.

(57) ABSTRACT

A fuel cell system with flow passages and/or flow chambers which conduct moist gases in operation is characterized in that at least a part of the flow passages and/or flow chambers is provided with a coating which takes up water in distributed form at low temperatures and releases the water again at least in part at higher temperatures. This coating makes it possible to operate the fuel cell system at pronounced temperatures below zero, such as, for example, −40° C., and to ensure an adequate humidification of the operating gases, which protects the membranes from damage and favors a faster starting up of the fuel cell system.

12 Claims, 2 Drawing Sheets

FUEL CELL WITH A DEVICE FOR STORING WATER

This is a division of application Ser. No. 09/996,859 filed on Nov. 20, 2001 now U.S. Pat. No. 6,794,076.

TECHNICAL FIELD

Fuel cell systems are known in various forms. For example there are, amongst others, the following types of fuel cells:

PEM fuel cells (Proton Exchange Membrane)

DMFC fuel cells (Direct Methanol Fuel Cell)

SOFC fuel cells (Solid Oxide Fuel Cell)

MCFC fuel cells (Molten Carbide Fuel Cell)

PAFC fuel cells (Phosphoric Acid Fuel Cell) and

AFC fuel cells (Alkaline Fuel Cell).

BACKGROUND OF THE INVENTION

Of these fuel cell types at least PEM fuel cells, which are fed with hydrogen or with a hydrogen-rich synthesized gas, require a certain relative humidity at the hydrogen side of the fuel cells in order to be able to operate. For this reason it has previously been customary to provide a water container at the anode side of the fuel cells which delivers water to the humidifying device for the humidifying of the hydrogen gas.

Furthermore, similar humidifying devices are provided at the cathode side of the fuel cells and ensure that the oxygen (normally in the form of air) supplied to the fuel cells at the cathode side of the fuel cells is appropriately humidified. The humidifying of the gases at both the anode side and at the cathode side is above all necessary when starting up the operation of the fuel cells. In the operation of the fuel cells water is produced and takes care of the necessary humidification of the corresponding gases, as will later be explained in more detail in the description of embodiments. The humidifying devices are thus in principle only required when the fuel cells are taken into operation in order to positively influence the starting behavior of the fuel cells. The provision of the corresponding water containers is, however, problematic, because at temperatures below zero attention must be paid that the water contained in the water containers does not freeze. Proposals have already been made relating to the omission of the water containers and humidifying devices.

Even when humidifying devices are omitted, a problem exists, and indeed that the water present at the cathode side and at the anode side of the fuel cells, which forms in operation, condenses during cooling of the fuel cells and forms water droplets. A pronounced danger exists that at temperatures below zero the water droplets which separate out in this way freeze and, in operation or on recommencing the operation of the fuel cells, at least partly hinder the gas flow through the relevant, frequently narrowly dimensioned, passages and chambers.

Ice formation of this kind can hinder or prevent the throughflow of hydrogen and/or atmospheric oxygen, so that the operation or a renewed commencement of operation of the fuel cell system is prevented or only starts up very slowly. Moreover, the corresponding gases are not humidified, because the water has separated out in the form of ice. The lack of humidification of the gases can lead to the membranes in the PEM fuel cell being damaged.

SUMMARY OF THE INVENTION

It is the object of the present invention to provide a fuel cell system of the initially named kind and also a method for the operation of such a fuel cell system which makes it straightforwardly possible to permit operation at temperatures below zero, for example down to −40° C., without the water which separates out hindering or preventing the required gas flow and without the membranes of the fuel cells being damaged or frost damage occurring in the fuel cell system. Furthermore, the necessity to provide a separate water container or a humidifying device should be avoided or, if they are present, to fully empty them at temperatures below zero.

Moreover, in accordance with the invention, the operation or the commencement of operation of the fuel cells should be possible at temperatures down to approximately −40° C. without the start-up phase taking place very slowly.

A further object of the present invention is to always ensure (even at low temperatures), that the relative humidity in the fuel cells, i.e. in the gases which flow through the fuel cells, remains at an acceptable at least substantially constant value.

In order to satisfy this object provision is made in accordance with the invention that at least a part of the flow passages and/or flow chambers is provided with a coating which, at low temperatures, takes up water in distributed form and releases the water at least in part again at higher temperatures.

The invention is thus based on the recognition that there are coatings which, at low temperatures, take up water in distributed form, whereby the formation of water droplets and the coalescence of water droplets into larger quantities of water is prevented, with the distributed form of the water being so finely distributed that the water does not freeze even at temperatures of −40° C. or less or, if it should freeze, does not lead to frost damage because of the small water volumes. Furthermore, it is recognized, in accordance with the invention, that the so stored quantities of water can be released again, at least partly, at higher operating temperatures and thus ensure the humidification of the corresponding gases.

Particularly favorable for a fuel cell is the fact that at low temperatures relatively little liberated water ensures the required relative humidity, whereas at higher temperatures a relatively large amount of water is released and can, even under these circumstances, ensure at least approximately the same relative humidity.

This signifies that the relative humidity in the gases or in the fuel cells can be kept at least substantially constant. This is ideal for the operation of a fuel cell. Excess water is given up with the exhaust gases of the fuel cells as water vapor. There is no need to store water in containers or to provide special humidifying devices in order to humidify the operating gases of the fuel cells. Simply and solely the provision of an appropriate coating thus makes it possible to dispense with humidifying devices and water containers at a stroke to enable the fuel cell system to operate at pronounced temperatures below zero such as, for example, −40° C. and to ensure adequate humidification of the operating gases, which protects the membranes from damage and favors a more rapid start-up of the fuel cell system.

There are numerous different ways of realizing a corresponding coating.

It is for example known that silicates with the general formula

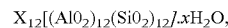

$$X_{12}[(AlO_2)_{12}(SiO_2)_{12}]\cdot xH_2O,$$

where X=Li, Na, K, Rb, or Cs and x is an integer, are in a position to take up relatively large quantities of water in the pores of the coating, with these pores having sizes in the nanometer range. The same applies to silicates of the general formula

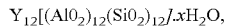

where Y=Be, Mg, Ca, Sr or Ba.

The coating can be realized as alkaline aluminum silicate or alkaline earth aluminum silicate, i.e. as so-called zeolites. The coating can moreover also comprise polysiloxanes, with a whole series of suitable polysiloxanes being known per se in the field of gas chromatography.

Another possibility of realizing the coating is to provide this in the form of a polymer which is provided with acid radicals or alkaline radicals which have a chemical affinity for water. For example, the polymer can be a modified polyethylene glycol. Such coatings and similar coatings are used in so-called gas chromatographs and are deposited there as thin coatings on the inner wall of long capillaries. The technology thus exists of equipping both passages and chambers of smaller dimensions with corresponding coatings. Moreover, the named materials for the coatings have the advantage that they are obtainable at a favorable price.

Furthermore, the invention is concerned with a method of operating a fuel cell system with flow passages and/or flow chambers which conduct moist gases in operation, with the special characterizing feature that after the switching off of the fuel cell system at least a part of the water contained in the moist gases is absorbed by a coating which is located on the inner side of at least a part of the flow passages and/or spaces and is stored there, that at temperatures below 0° C. freezing of the water does not occur or only occurs to a non-damaging extent and that, on recommencing the operation of the fuel cell system and the associated heating up, water which is stored by the coating is liberated again, at least in part, and is exploited for the required humidifying of the gases.

Particularly preferred embodiments of the fuel cell system or of the operating method can be found in the subordinate claims and also in the following description.

BRIEF DESCRIPTION OF THE DRAWINGS

The invention will subsequently be explained in more detail with respect to a series of sketches which is shown in the drawing.

DESCRIPTION OF THE PREFERRED EMBODIMENT

Figure 1:
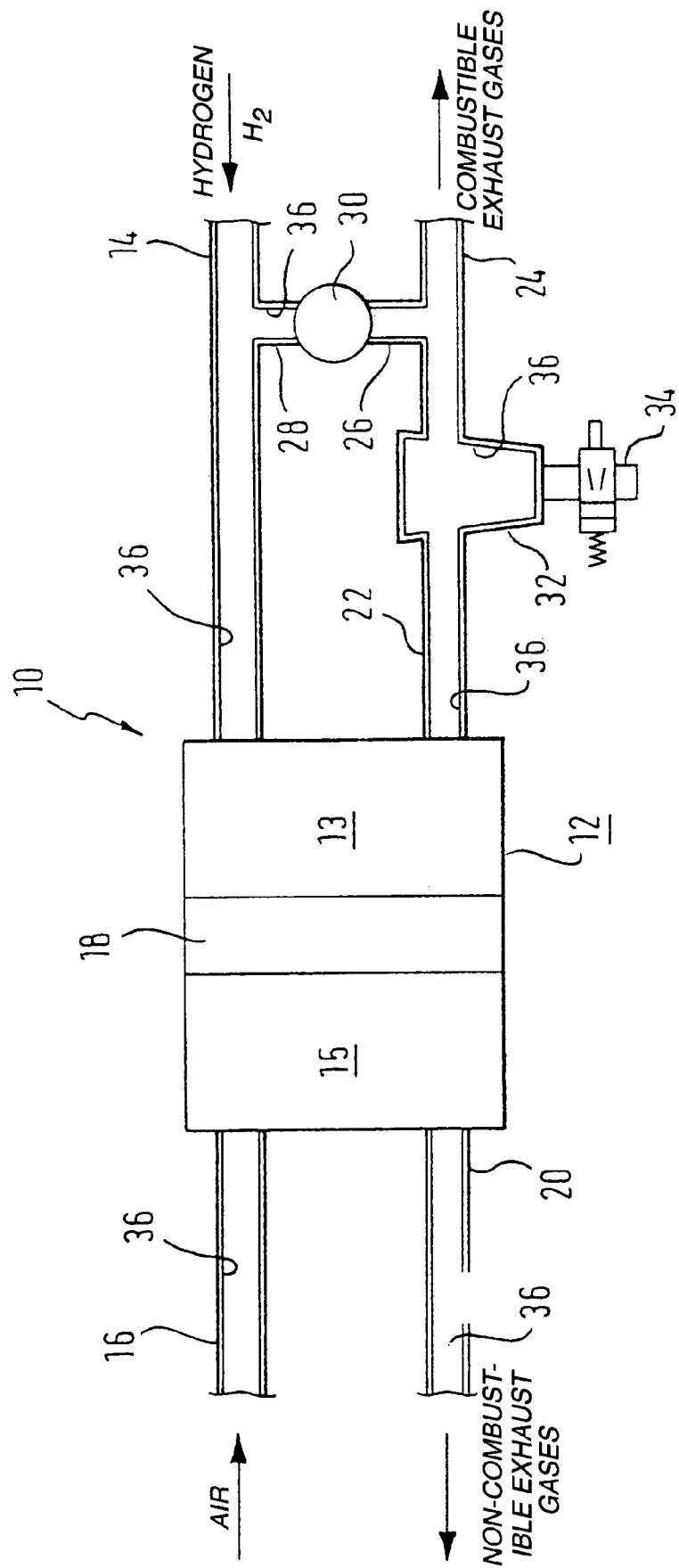
FIG. 1 shows a schematic representation of a single PEM fuel cell which is provided with a coating in accordance with the invention.

FIG. 1 shows a schematic representation of a fuel cell system 10, and indeed restricted to the so-called stack 12, i.e. to a stack of fuel cells arranged above one another or alongside one another, together with the lines which directly connect to the stack 12. Hydrogen is supplied at a certain overpressure, i.e. pressure above atmospheric pressure, via the line 14 to the stack 12 at the anode side. At the cathode side 15 air is supplied to the stack 12 via the line 16, likewise with a suitable overpressure. The fuel cell comprises a membrane, here schematically illustrated at 18, which must be kept moist in operation. The hydrogen supplied via the line 14 delivers protons which move through the membrane 18 and react at the other side of the membrane with the air that is supplied and form water vapor which is led away as non-combustible exhaust gases via the line 20.

Since it is not possible to ensure that the total quantity of hydrogen which is supplied via the line 14 to the stack is reacted in the stack 12 with atmospheric oxygen, a part of the hydrogen leaves the stack 12 again via the line 22 and is led away via the further line 24 as combustible exhaust gas to a combustion chamber where it is burned with additional air to produce clean exhaust gases, optionally with simultaneously heat recovery.

A part of the hydrogen flowing away via the line 22 is, however, frequently fed into the line 14 again via the connections lines 26 and 28 and a pump 30, i.e. it is recirculated.

Water is present both at the anode side 13 of the fuel cell system, i.e. the hydrogen side, and also at the cathode side of the fuel cell system, i.e. the air side (as will be explained later in more detail) and it is possible to collect the water in a container 32 and optionally to supply it via a line 34 to a humidifying device (not shown) for the quantity of hydrogen which is supplied.

It is moreover possible to arrange a corresponding water collecting chamber at the air side of the fuel cell system and optionally to add a humidifying device for the air that is supplied. The system as previously described is well known in the prior art and will thus not be explained in further detail.

Important for the present invention and not known in the prior art is the provision of a coating such as 36 in all or at least a part of some of the flow passages and/or flow chambers of the fuel cell system, with the coating being able to take up water in finely distributed form, as will later be explained in more detail. First of all, however, the arrangement of the coating 36 within a fuel cell will be described with reference to FIG. 2, with the description of the fuel cell as a whole being useful for a better understanding of the fuel cell system.

Figure 2:
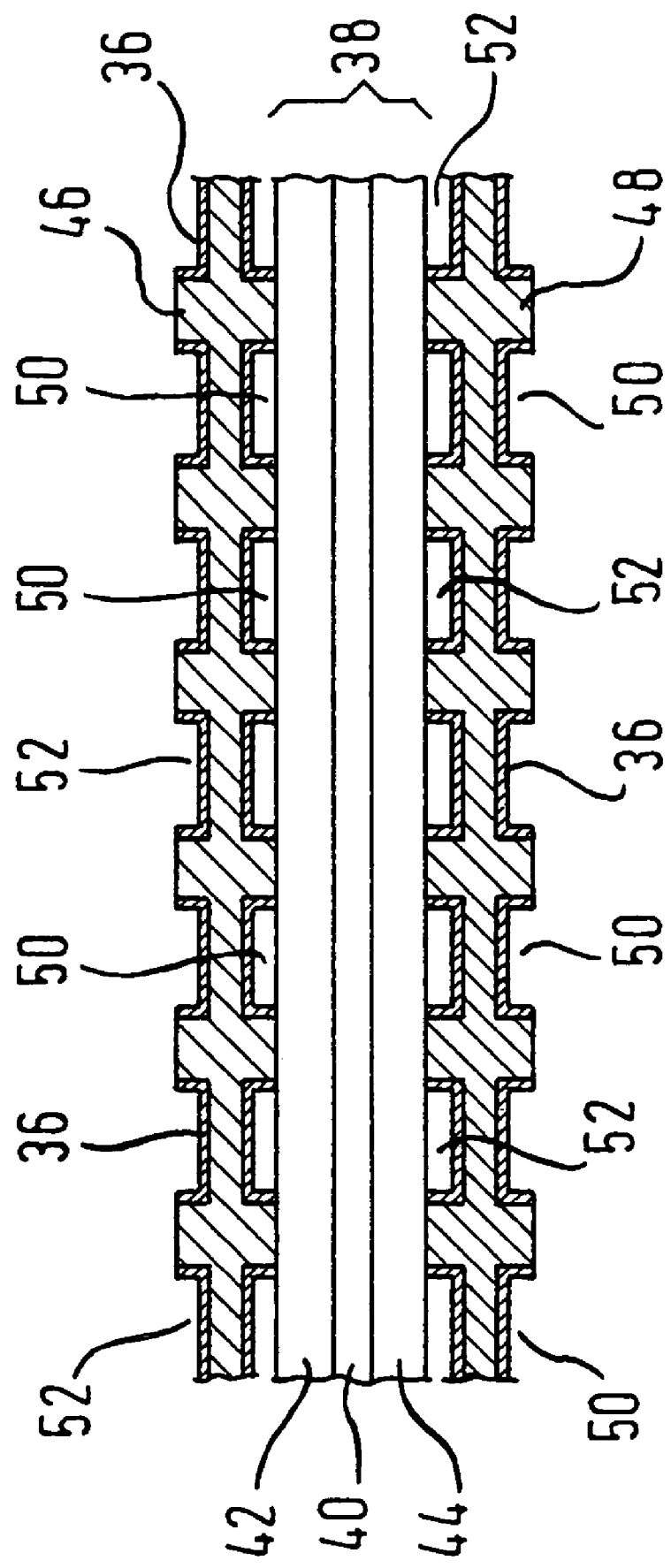
FIG. 2 shows a schematic representation of a part of a PEM fuel cell provided with a coating in accordance with the invention and seen in cross-section.

FIG. 2 shows, likewise in a highly schematic form and not true to scale, a section of a single fuel cell in cross-section. The central part of the fuel cell 38 is the so-called MEA (Membrane Electrode Assembly) and consists of a central membrane 40, for example of NAFION, which is obtainable from the company A.I. Dupont de Nemur & Co., with a comparable product, for example also being obtainable from the Dow Chemical Company. At the top side of the membrane 40 in FIG. 2 there is an electrode 42, which in this case represents the anode, whereas a further electrode, the cathode 44, is located beneath the membrane 40.

The electrodes 42 and 44 consist in this example, in a manner known per se, of finely divided carbon particles, finely divided catalyst particles and a proton-conducting material. The catalyst particles consist preferably of platinum and are carried on the internal and external surfaces of the carbon particles which form the electrode 42. The particles of the electrodes form pores which enable the respective gases (hydrogen at the anode side and atmospheric oxygen at the cathode side) to migrate through the electrodes, so that electrochemical reactions can take place adjacent to the catalyst particles.

The cathode 44 is very similar to the anode 42 in its basic function, but differs in certain characteristics in order to satisfy the respective tasks. An MEA 38 of this kind is, for example, described in detail in U.S. Pat. No. 5,272,017 issued Dec. 21, 1993 to Swathirajan et al. and assigned to the assignee of the present application The MEA 38 is, as customary, arranged between two so-called bipolar plates 46 and 48, with the bipolar plate 46 having flow passages and chambers such as 50 through which hydrogen flows, so that the hydrogen can be led up to the MEA 38. At the same time the bipolar plate 46 serves for an electrical contact to the electrode 42 of the MEA, so that the electrical current produced in the fuel cell can be led away via the bipolar plates. The bipolar plates consist normally either of metal or of graphite, for example graphite with a plastic binder.

The bipolar plate 48 at the lower side of the MEA 38 in FIG. 2 is formed identically to the bipolar plate 46, the flow passages 52 facing the MEA 38 serve, however, here for the supply of air and oxygen, so that the desired electrochemical reactions can take place.

The upper side of the bipolar plate 46 of FIG. 2 is equipped with corresponding flow passages 52 which serve in a fuel cell system consisting of a stack of fuel cells, i.e. in a stack 12, for the supply of atmospheric oxygen to the above lying MEA (not shown) of the above lying cell.

In the same manner, the lower bipolar plate 48 has flow passages and chambers 50 which ensure the supply of hydrogen to the MEA of the lower lying fuel cell (likewise not shown). Thus, each bipolar plate 46 and 48 respectively is in contact at one side with the anode of a fuel cell and at the other side with the cathode of a neighboring fuel cell. The bipolar plates are impermeable for the gases hydrogen and oxygen which are supplied to them serve. However, they serve to enable the electrical current flow through the fuel cell, which is why they must be electrically conductive.

In FIG. 2 the reference numeral 36 also signifies the coating of the invention which is present at the base surfaces and side surfaces of the flow channels, flow passages and flow chambers which are formed in the electrodes, in order to take up water there.

For the sake of completeness it is pointed out that in such a fuel cell the molecular hydrogen $H_2$ at the anode is split up in accordance with the following equation:

$$H_2 \rightarrow 2H^+ + 2e.$$

The protons, i.e. the $H^+$ components, can migrate through the membrane 40 and react at the other side of the membrane 40 with oxygen in accordance with the following equation:

$$\tfrac{1}{2}O_2 + 2H^+ + 2e \rightarrow H_2O.$$

One thus sees that water arises at the cathode side; this is led away either by simply flowing away or by vaporization. It is, however, possible, as mentioned above, to provide a water collecting container in order to collect the water that is formed and to remove it from the fuel cell.

A certain reverse diffusion of water from the cathode side to the anode side of the fuel cells takes place, which is why water is present there in operation which can ensure the humidification of the hydrogen. It is, however, important, particularly when commencing operation of the fuel cells, to humidify the hydrogen and hereby the membranes in order to ensure the correct functioning of the fuel cell and to avoid damaging the membrane.

Water is moreover drawn by an electro-osmotic transport mechanism with the proton flux from the anode to the cathode. From this it is evident that water is necessarily present both at the anode and also at the cathode side in the operation of the fuel cell. It is important that a certain relative humidity prevails at both sides, with a relative humidity of at least approximately 50% having proved to be favorable.

At this point it should be noted that there are many different embodiments of PEM fuel cells but that all, even if they have different constructions, operate similarly in principle and all have chambers and passages which conduct hydrogen and oxygen and all produce water.

The coating 36 of the invention plays a decisive role in connection with the humidification of the operating gases and of the ability of the fuel cell to operate and also in avoiding damage and poor characteristics at low temperatures of the fuel cells.

When the coating of the invention is not present, a situation can arise in which, during operation of the fuel cell system at low temperatures or on switching off the fuel cell system, water condenses in the tubes and flow passages and flow chambers and can freeze there, for example once operation has ceased. The water droplets can coalesce and fully block the throughflow of the supplied gases. Through the freezing of the water, frost damage can also arise in the fuel cell system as well as damage to the membranes up to bursting of the tubes or parts of the fuel cells.

The operation of a fuel cell system, for example in a motor vehicle at low temperatures, can also be severely restricted through the condensing out and freezing of water. When a supply container is provided for a humidifying device, or when a water separator is present within the fuel cell system, the danger also exists that the water which freezes there will damage the system. With water separators this can, however, be hindered by discharging water from the water separator on termination of the operation or at suitable time intervals during the operation. This can, for example, take place by temporarily opening a solenoid valve.

The coating of the invention completely avoids these problems. By coating the flow passages, tubes and flow chambers of the fuel cell system in part or fully with porous silicate materials ($SiO_2$) water droplets are readily sucked up and distributed in the coating. The materials used normally have pore diameters in the range from about 3 to 12 nm. By storing water within such small pores, the melting point of the water can be lowered to about $-50°$ C. Thus, the water in the fuel cell vehicle remains liquid down to outside temperatures of $-50°$ C. and can now remain in the vehicle.

Since water is quasi sucked up by the coating, no larger water droplets remain which could freeze and could lead to blocking of the fuel cell system, so that at such cold outside temperatures the hydrogen circuit and the oxygen circuit remain free and fully operational, so that a starting up at such low outside temperatures is straightforwardly possible. Since the water is present in the pores in a liquid state, it also ensures that the desired relative humidity is still present and that water is liberated at increasing temperatures and can be taken up by the gas flows.

In this manner ever less water is stored in the coating at increasing temperatures and passes in vapor form into the gas flows, so that the desired relative humidity of for example 50% can be retained over a wide temperature range. In this manner, a humidifying device for the hydrogen and oxygen is unnecessary, so that the corresponding storage containers can also be omitted and the danger that these freeze is no longer present.

Water separators, above all at the oxygen side of the fuel cell system, can still be required. They can, however, always be emptied so that a freezing problem also does not exist here. In order to have an adequate water available for starting, a container can, if required, be provided at the hydrogen side of the system which is filled with a larger amount of the appropriate coating material. The great advantage is then present that the gases can be humidified relatively quickly after starting.

The coating can have the form of an aluminum silicate with the general formula:

$$X_{12}[(AlO_2)_{12}(SiO_2)_{12}].xH_2O$$

$$\text{or } X_{12}(Al_{12}Si_{12}O_{24}).xH_2O$$

$$\text{or } X_{43}(Al_{43}Si_{83}O_{24}).xH_2O$$

$$\text{or } X_{28}(Al_{28}Si_{68}O_{96}).xH_2O$$

where X=Li, Na, K. Rb, or Cs and x is an integer and the water is taken up in the pores of the coating 36 which have sizes in the nanometer range. Alternatively, the coating can have the following general formula:

$$Y_6[(AlO_2)_{12}(SiO_2)_{12}].xH_2O$$

where Y=Be, Mg, Ca, Sr, or Ba and x is an integer and the water is taken up in the pores of the coating 36, which have sizes in the nanometer range.

A coating of this kind can, depending on its design, store approximately 15 to 70% of its own weight in water. The material can be reactivated at temperatures between 80 and 500° C., i.e. fully dried out, so that the material is prepared again for the taking up of water on cooling down of the system. The material has a density of approximately 1 g/ml and can be manufactured, depending on the pore size, in the range of densities from 0.01 to 10 g/ml. The material has a specific surface of 50 to 2000 $m^2/g$, normally about 750 $m^2/g$ and can also be straightforwardly provided with pore diameters in sizes between 0.1 and 12 nm, with 2 to 10 nm being customary. The pore volume lies at approximately 0.1 to 100 ml/g, normally at 0.35 ml/g. The material has a specific heat in the range between 0.1 and 10 kJ/kg° C.

As further alternatives a whole series of so-called polysiloxanes can be considered for the coating, such as:

dimethylpolysiloxane,

5%-phenyl-95%-dimethylpolysiloxane,

35%-phenyl-65%-dimethylpolysiloxane,

50%-phenyl-50%-dimethylpolysiloxane,

6%-cyanopropylphenyl-94%-methylpolysiloxane,

14%-cyanopropylphenyl-86%-dimethylpolysiloxane,

70% cyanopropyl(equiv.)polysilphenylene-siloxane,

5% phenyl(equiv.)polycarborane-siloxane,

8% phenyl(equiv.)polycarborane-siloxane,

5% phenylmethylpolysiloxane, silphenylene polysiloxane,

50%-trifluorophenylmethylpolysiloxane,

50%-cyanopropylphenylmethylpolysiloxane, cyanopropylphenylmethylpolysiloxane,

50% phenyl-methyl-polysiloxane,

14% cyanopropyl-phenyl-methylpolysiloxane.

75% phenyl-25% methylpolysiloxane

25% phenyl-75% methylpolysiloxane

20% phenylmethyl-80% dimethylpolysiloxane

1% vinyl-5% phenylmethysiloxane.

A polymer can also be considered for the coating 36 which is provided with acid radicals or alkaline radicals which have a chemical affinity for water. One example for this is a modified polyethylene glycol. In such polymers, the water is not taken up into pores of the coating, but is instead chemically bound at the corresponding radicals. Here, a very fine distribution of the water is also present.

The invention claimed is:

1. A fuel cell system comprising flow passages and/or flow chambers which are formed in a bipolar plate of a fuel cell and which conduct moist gases in operation, and wherein at least a part of the flow passages and/or flow chambers which are formed in the bipolar plate of the fuel cell are provided with a coating which, at low temperatures, takes up water in distributed form and releases the water at least in part again at higher temperatures.

2. A fuel cell system in accordance with claim 1, wherein the coating is a silicate with the general formula:

$$X_{12}[(AlO_2)_{12}(SiO_2)_{12}].xH_2O$$

$$\text{or } X_{12}(AlSi_{12}O_{24}).xH_2O$$

$$\text{or } X_{43}(Al_{43}Si_{83}O_{24}).xH_2O$$

$$\text{or } X_{28}(Al_{28}Si_{68}O_{96}).xH_2O$$

where X=Li, Na, K, Rb, or Cs and x is an integer and the water is taken up in the pores of the coating.

3. A fuel cell system in accordance with claim 1, wherein the coating is a silicate with the general formula:

$$Y_6[(AlO_2)_{12}(SiO_2)_{12}].xH_2O, \text{ where } Y=Be, Mg, Ca, Sr, \text{ or } Ba,$$

and x is an integer and the water is taken up in the pores of the coating.

4. A fuel cell system in accordance with claim 1, wherein the coating comprises alkaline and alkaline earth aluminum silicates.

5. A fuel cell system in accordance with claim 1, wherein the coating comprises polysiloxane.

6. A fuel cell system in accordance with claim 1, wherein the coating comprises a polymer which is provided with acid radicals or alkaline radicals which have a chemical affinity for water.

7. A fuel cell system in accordance with claim 6, wherein the polymer is a modified polyethylene glycol.

8. A fuel cell system in accordance with claim 1, wherein the coating is present on said flow passages and/or flow chambers which are formed in the bipolar plate of the fuel cell and which define an anode side of said fuel cell system.

9. A fuel cell system in accordance with claim 1, wherein the coating is located on said flow passages and/or flow chambers which are formed in the bipolar plate of the fuel cell and which define a cathode side of said fuel cell system.

10. A fuel cell system in accordance with claim 2 in which the pores of the coating have sizes in the range of 0.1 nm to 12 nm.

11. A fuel cell system in accordance with claim 3 in which the pores of the coating have sizes in the range of 0.1 nm to 12 nm.

12. A fuel cell system in accordance with claim 1 in which the coating is present at base surfaces and side surfaces of the flow passages and/or flow chambers which are formed in the bipolar plate.

* * * * *